United States Patent [19]

Ellis

[11] 4,392,555
[45] Jul. 12, 1983

[54] FALL PROTECTION DEVICE

[76] Inventor: J. Nigel Ellis, 306 Country Club Dr., Wilmington, Del. 19803

[21] Appl. No.: 260,205

[22] Filed: May 4, 1981

[51] Int. Cl.³ .......................................... B65H 59/14
[52] U.S. Cl. ................................. 188/65.1; 24/115 L; 182/5
[58] Field of Search .................... 188/65.1, 65.2, 65.3, 188/65.4, 65.5, 67; 182/234, 235, 5, 6, 7, 191, 192; 24/115 L, 115 M, 115 G, 115 R, 115 B, 115 K, 115 F, 115 H; 198/494

[56] References Cited

U.S. PATENT DOCUMENTS

| | | | |
|---|---|---|---|
| 3,220,511 | 11/1965 | Holkesvick | 188/65.4 |
| 3,335,469 | 8/1967 | Shand et al. | 188/65.1 X |
| 3,550,726 | 12/1970 | Chezem et al. | 188/65.4 |
| 3,948,362 | 4/1976 | Greest | 188/65.2 |

Primary Examiner—Douglas C. Butler
Attorney, Agent, or Firm—Peter J. Georges

[57] ABSTRACT

A fall protection safety device is disclosed which is suitable for use in environments wherein suspended particulate matter is present. The device comprises an elongated tubular housing having an upper end guide block with a centrally located opening therein and a lower end guide block with a centrally located opening therein. The lower guide block has a plurality of openings spaced apart from and around its centrally located opening. A safety line is threaded within the tubular housing and movement thereof is prevented by camming a line-gripping ball and cage arrangement associated with a piston upwardly within a conical bore of a wedging ring. The piston has a centrally located opening through which the safety line is threaded and a serrated outer surface adjacent to and circumscribed by the inner surface of the elongate tubular housing.

2 Claims, 4 Drawing Figures

FALL PROTECTION DEVICE

FIELD OF THE INVENTION

This invention relates to safety equipment for fall protection of personnel working at elevated heights.

BACKGROUND OF THE INVENTION

The invention specifically pertains to an improvement in fall protection devices of the type described in U.S. Pat. Nos. 3,335,469 and 3,948,362 the disclosure of which is incorporated herein by reference thereto.

The devices described in U.S. Pat. Nos. 3,335,469 and 3,948,362 are a variety of "safety anchors" which comprise a tube through which a safety line is threaded and which has therein a wedge member and a line-gripping member. The tube is attached to the worker. Upon sudden downward acceleration, which occurs in the event of a fall, by inertia and or camming, the line gripping member in the tube is brought to bear against the wedge whereby the line gripping member engages the rope and further downward movement is prevented.

The fall protection devices of the prior art as specifically described above operate satisfactorily in most environments; however, where organic particulate matter is present as in a grain elevator, failure of the devices has been observed.

It was the observed failure of fall protection devices resembling those described in U.S. Pat. No. 3,948,362 which led to my development of the improved device wherein described and claimed.

Although not wishing to be bound it is believed that the observed failures resulted because particles in the environment collect and interfere with operation of the line gripping member preventing satisfactory engagement with the rope threaded through the tubular housing.

Detrimental accumulation can not be prevented by arrangements adapted to mask the openings through which the safety line is threaded. This is believed to indicate that accumulation and/or deposition in or upon the functioning components within the tubular housing may occur as a result of particulate matter transferred by the safety line which it is believed may have an enhanced attraction for suspended particulate matter due to a triboelectric effect associated with contact attendant to movement through the tubular housing.

The fall protection safety device of my invention which is suitable for use in environments wherein suspended particulate matter is present comprises an elongated tubular housing having an upper open end, a lower open end, and an elongate volume therebetween. An upper end guide block having a centrally located opening therein is secured to the upper open end of the housing. A lower end guide block having a centrally located opening therein and a plurality of openings spaced apart from and around the centrally located opening is secured to the lower end of the housing. The upper and lower end guide block openings define a central passageway through which a safety line is threaded. Within the tubular housing, a wedging ring having a centrally located conical bore is secured. A line-gripping means for gripping the safety line (threaded through the central passgeway and extending through the tubular housing) by movement upwardly within the conical bore of the wedging ring is located below the wedging ring. The line gripping means is associated with a piston also having a centrally located opening and a serrated outer surface adjacent to and circumscribed by the inner surface of the elongate tubular housing. The line-gripping means and associated piston are axially movable within the elongate tubular housing.

Means for moving a piston and associated line-gripping means upwardly within the conical bore of the wedging ring such as a cam and loop link arrangement are most suitable to engage the line-gripping means and safety line. A single link located at the lower portion of the tubular housing is most preferred for balance and worker attachment safety.

SUMMARY OF THE INVENTION

According to the present invention there is provided a fall protection device comprising an elongated tubular housing having an upper open end, a lower open end, and an elongate volume therebetween. An upper end guide block having a centrally located opening therein is secured to the upper open end of the housing. A lower end guide block having a centrally located opening therein and a plurality of openings spaced apart from and around the centrally located opening is secured to the lower end of the housing. The upper and lower end guide block openings define a central passageway through which a safety line is threaded. Within the tubular housing, a wedging ring having a centrally located conical bore is secured. A line-gripping means for gripping the safety line (threaded through the central passageway and extending through the tubular housing) by movement upwardly within the conical bore of the wedging ring is located below the wedging ring. The line gripping means is associated with a piston also having a centrally located opening and serrated outer surface adjacent to and circumscribed by the inner surface of the elongate tubular housing. The line-gripping means and associated piston are axially moveable within the elongate tubular housing.

Means for moving a piston and associated line-gripping means upwardly within the conical bore of the wedging ring such as a cam and loop link arrangement are most suitable to engage the line-gripping means and safety line. A single link located at the lower portion of the tubular housing is most preferred for balance and worker attachment safety.

BRIEF DESCRIPTION OF THE DRAWINGS

The invention will now be particularly described by way of example with reference to the accompanying drawings in which.

DETAILED DESCRIPTION OF THE DRAWINGS

Figure 1:
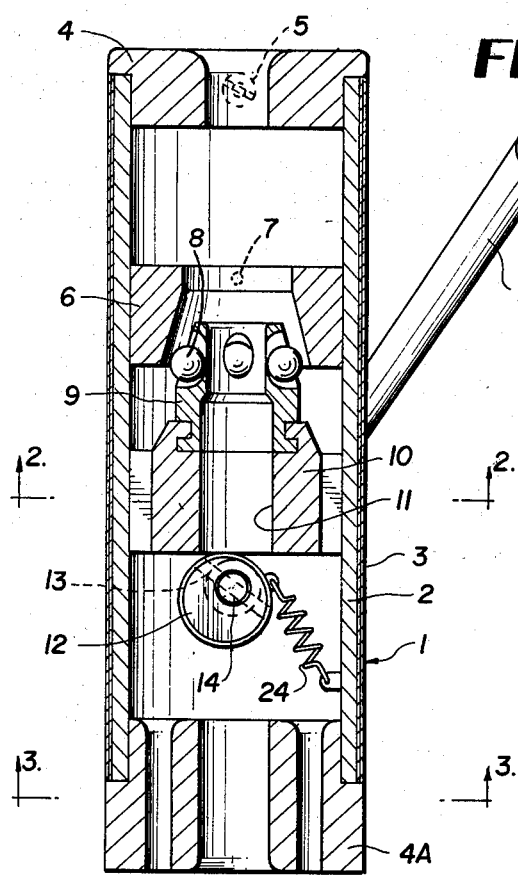
FIGS. 1 and 4 are longitudinal sectional elevations of the fall protection device.

In the drawings, the fall protection devices generally indicated at 1 comprise an elongated tubular housing of cylindrical shape, housing 2, suitably of steel with a synthetic plastics sheath 3, e.g. of polyethylene. Upper guide block 4 and lower guide block 4a which may be jam fitted into each end of the housing 2 and secured by screws 5 partially close each end of the housing and define a central passageway through which a safety line (not shown) may be threaded. The safetly line may suitably be made of a strong polymeric material.

A wedging ring 6 which has a generally conical bore is secured within the housing by pins 7. The illustrated line gripping means is comprised of safety line gripping members, balls 8, carried by a cage 9 associated with an axially movable piston 10 which is displaceable relative to the ring 6 so that the balls 8 can move along the conical bore of that ring to wedge against and grip a safety line threaded through the guide blocks 4a and through a centrally located axial hole 11 in the movable piston 10. (see especially FIGS. 1 and 4).

Figure 2:
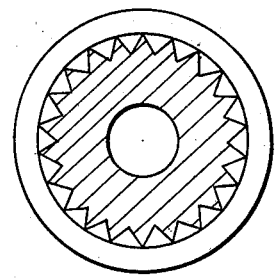
FIG. 2 is a horizontal sectional taken along line 2—2 of FIG. 1.
Figure 3:
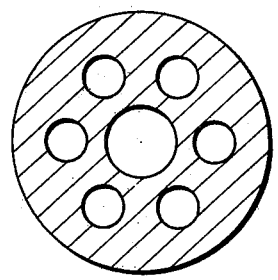
FIG. 3 is a horizontal sectional taken along line 3—3 of FIG. 1.

As best illustrated in FIG. 2, the outer surface of the piston adjacent to and circumscribed by the inner surface of the elongate tubular housing is serrated. The relative displacement of the wedging ring 6 and the gripping members 8 is initiated by the action of cams 12 fixed e.g. by pins 13 to the ends of loop link member 14 which protrudes into the housing 2 through diametrically opposed holes 15 (FIG. 4) so that such loop link member is pivotally attached to the housing of the fall protection device 1. The loop link member 14 serves as the point of attachment for a safety belt or harness of the worker being protected.

A spring 24 is attached to the tubular member and at least one of the cams to bias the linkage formed by the tubular housing and loop link member 14 for downward pivotal movement.

Figure 4:
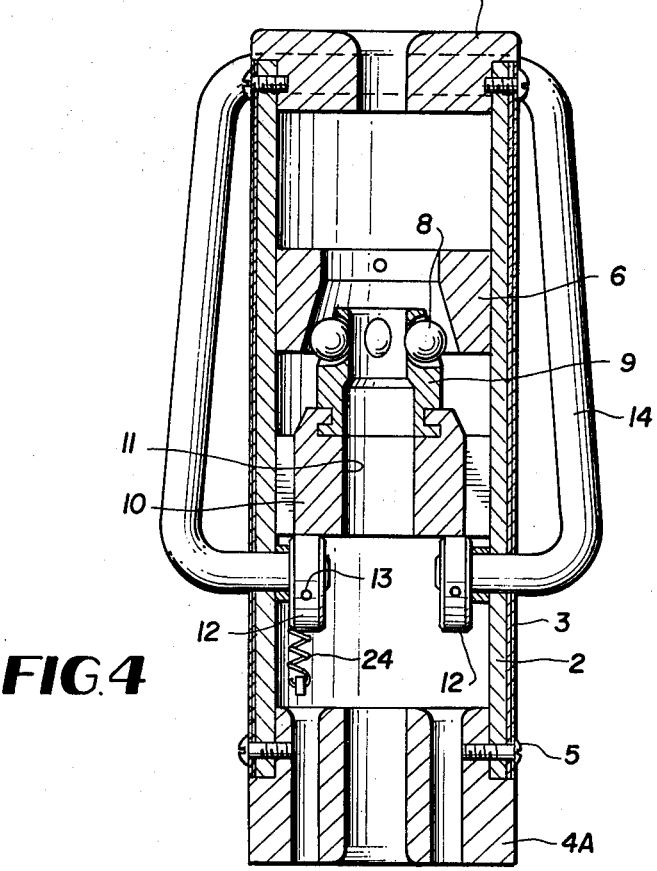

In use, a safety line (not shown) is threaded through the fall protection device 1 and loop link member 14 is attached to a safety belt so that the device hangs from the belt in the condition shown in FIGS. 1 and 4 whereby it can slide freely up and down the line. Should the user fall however, loop link member 14 will rapidly accelerate downwards with respect to the fall protection device, (this relative acceleration being augmented by the action of the spring 24) and by virtue of the downward pivotal movement of link member 14, cams 12 will be rotated and lift the axially movable piston 10 within the housing. It will be noted that the cam action on the lower end surface of the axially movable piston 10 is substantially symmetrical of the axis of the fall protection device. Lifting of the axially movable piston 10 causes the line-gripping balls 8 to be urged radially inwardly as they rise within the conical bore of the wedging ring 6 into at least rubbing engagement with the safety line (not shown). Frictional contact between the line and the balls tends to force them even further up the conical bore so that they grip a line even more firmly and prevent further movement of the line.

The grip on the safety line may be released simply by returning loop link member 14 to the position shown in FIG. 1 and pulling the fall protection device up the safety line for a short distance.

It will, of course, be appreciated that for correct operation of the device specifically described above, the size of the line-gripping balls 8 and the size and conicity of the bore of the wedging ring 6 must be chosen with a particular size of safety line in mind, and that the device should only be used in conjunction with a line of substantially uniform diameter. In any particular case, if the safety line is too thin, then the device will fail to grip even on fall of a user, and if the line is too thick, it may be impossible to slide the runner along the line even in normal descent.

Although a specific example of the invention has hereinabove been described as will be obvious to those skilled in the art, various modifications may be made without departing from the spirit of the invention which is intended to be limited solely by the appended claims.

I claim:

1. In a fall protection safety device comprising:
   (1) an elongated tubular housing having an upper open end, a lower open end, and an elongate volume therebetween;
   (2) an upper end guide block having a centrally located opening therein, said upper end guide block being secured to said upper open end of the housing;
   (3) a lower end guide block having a centrally located opening therein, said lower end guide block being secured to said lower end of the housing, said upper and lower end guide block openings defining a central passageway through which a safety line may be threaded;
   (4) a wedging ring having a centrally located conical bore, said wedging ring being secured within the elongate volume;
   (5) an axially movable line-gripping means for gripping a safety line upon movement upwardly within the conical bore of the wedging ring, said axially movable line-gripping means being associated with an axially movable piston having a centrally located opening and an outer surface adjacent to and circumscribed by the inner surface of said elongate tubular housing; and,
   (6) moving means for moving the axially movable piston and the associated line-gripping means upwardly within the conical bore of the wedging ring;
the improvement which comprises:
   (7) a serrated outer piston surface on said axially movable piston; and,
   (8) a plurality of openings spaced apart from and around the centrally located opening of said lower end guide.

2. The fall protection device of claim 1 further characterized in that the openings in the lower end guide block are fluted at the surface of the guide block interior of the tubular housing.

* * * * *